United States Patent
Enokida (12)

(10) Patent No.: US 6,473,859 B1
(45) Date of Patent: Oct. 29, 2002

(54) IMAGE PROCESSING APPARATUS, METHOD, AND SYSTEM, AND COMPUTER-READABLE STORAGE MEDIUM HAVING PROGRAM STORED THEREIN

(75) Inventor: Miyuki Enokida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/302,252

(22) Filed: Apr. 30, 1999

(30) Foreign Application Priority Data

May 19, 1998 (JP) .......................................... 10-136708

(51) Int. Cl.$^7$ ................................................ G06F 1/24
(52) U.S. Cl. ...................... 713/164; 713/168; 713/200; 713/201
(58) Field of Search ................................ 713/164, 168, 713/189, 200, 201

(56) References Cited

U.S. PATENT DOCUMENTS 5,841,865 A * 11/1998 Sudia .......................... 380/277
5,844,553 A * 12/1998 Hao et al. ................... 345/733
5,857,022 A * 1/1999 Sudia .......................... 380/277

* cited by examiner

*Primary Examiner*—Thomas R. Peeso
(74) *Attorney, Agent, or Firm*—Fitzpatrick, Cella, Harper & Scinto

(57) ABSTRACT

An image data distribution system includes a server, side and a client side. The server side codes original image data into hierarchical coded data formed of a plurality of hierarchies, and encrypts at least one of the hierarchies. The server side further adds a predetermined code (code for causing a part of a decoding process to be skipped) to coded data of the encrypted hierarchy. When the hierarchical coded data is to be decoded, the client side does not perform a decoding process on the hierarchy to which the predetermined code is added and performs a decoding process on the coded data of the hierarchy when predetermined conditions are satisfied. This makes it possible to easily and reliably manage image data used for a plurality of types of purposes and to reliably protect the copyright of the image data.

24 Claims, 11 Drawing Sheets

IMAGE PROCESSING APPARATUS, METHOD, AND SYSTEM, AND COMPUTER-READABLE STORAGE MEDIUM HAVING PROGRAM STORED THEREIN

BACKGROUND OF THE INVENTION

1. Field of the Invention

The present invention relates to an image processing apparatus, method, and system, and to a computer-readable storage medium having a program for image processing stored therein. More particularly, the present invention relates to technology for managing digitized image data and technology for protecting the copyright of the image data.

2. Description of the Related Art

Hitherto, for example, a system is known in which coded image data is exchanged between a client side and a server side over a communication network or the like.

For example, a first system can be constructed in such a way that a server side transfers an image file (coded) requested from a client side as is to the client side. A second system can be constructed in such a way that after an encryption process is performed on the entire image file requested from the client side, key information for decoding a code, together with the image file, is transferred to the client side.

However, digital data has a property that a complete copy can be easily created in large numbers. Therefore, in the first system in which a digitized image is transferred as is, there is a problem that a copy having the same properties as those of the original image may be illegally created, and the illegal copy can be redistributed on the client side. Appropriate royalties, which should be paid to the author of the image data or to an agent (seller) to whom right of sale is legally entrusted by the author, are not paid, and the copyright is infringed.

Furthermore, in the second system in which an encryption process is performed on the entire image file for the purpose of protecting the copyright, an image file which is available to the general public and which can be referred to by anybody, and an image file on which an encryption process is performed, which is transferred when a request is made from a specific client side, must be separately provided, and these must be used differently according to the situation.

SUMMARY OF THE INVENTION

An object of the present invention is to solve the above-described problems.

Another object of the present invention is to provide technology for easily and reliably managing an image used for a plurality of types of purposes and for reliably protecting the copyright of the image.

A further object of the present invention is to provide technology for easily and reliably protecting the copyright of an image used for a plurality of types of purposes without requiring a complex process in an image processing apparatus, method, and system, and in a computer-readable storage medium having a program stored therein.

In order to achieve the above objects, in a first aspect, the present invention provides an image processing apparatus comprising coding means for converting image data into hierarchical coded data; and encryption means for encrypting a predetermined hierarchy among the hierarchical coded data, wherein a code for causing a part of a process for decoding the hierarchical coded data to be skipped is added to the encrypted hierarchy.

In a second aspect, the present invention provides an image processing apparatus comprising: decoding means for decoding an image file composed of hierarchical coded data; and decryption means for decrypting a hierarchy to which is added a code for causing a part of a process of the decoding means to be skipped among the hierarchical coded data.

In a third aspect, the present invention provides an image processing apparatus comprising: decoding means for decoding an image file composed of hierarchical coded data; and control means for controlling the decoding means to decode a hierarchy to which is not added a code for causing a part of a process of the decoding means to be skipped among the hierarchical coded data.

In a fourth second aspect, the present invention provides an image processing apparatus comprising: coding means for converting an input image into hierarchical coded data; and means for adding a code for causing a part of a process for decoding the hierarchical coded data to be skipped, to a predetermined hierarchy among the hierarchical coded data.

In a fifth aspect, the present invention provides an image processing method, comprising the steps of: converting image data into hierarchical coded data; encrypting a predetermined hierarchy among the hierarchical coded data; and adding to the encrypted hierarchy a code for causing a part of a process for decoding the hierarchical coded data to be skipped.

In a sixth aspect, the present invention provides an image processing method comprising the steps of: decoding image data which is converted into hierarchical coded data; and decrypting a hierarchy to which is added a code for causing a part of a process of the decoding step to be skipped.

In a seventh aspect, the present invention provides an image processing method comprising the steps of: decoding an image file composed of hierarchical coded data; and controlling the decoding step to decode a hierarchy to which is not added a code for causing a part of a process of the decoding step to be skipped among the hierarchical coded data.

In an eighth aspect, the present invention provides an image processing method comprising the steps of: converting image data into hierarchical coded data; and adding to a predetermined hierarchy among the hierarchical coded data a code for causing a part of a process for decoding the hierarchical coded data to be skipped.

In a ninth aspect, the present invention provides an image processing system comprising: a first apparatus comprising coding means for converting image data into hierarchical coded data, and means for adding to a predetermined hierarchy among the hierarchical coded data a predetermined code for causing a process for decoding hierarchical coded data to be skipped; and a second apparatus comprising decoding means for decoding the hierarchical coded data, wherein the second apparatus decodes a hierarchy other than the hierarchy to which the predetermined code is added.

In a tenth aspect, the present invention provides a computer-readable storage medium storing a program for image processing, the program comprising the steps of: converting image data into hierarchical coded data; encrypting a predetermined hierarchy among the hierarchical coded data; and adding to the encrypted hierarchy a code for causing a part of a process for decoding the hierarchical coded data to be skipped.

In an eleventh aspect, the present invention provides a computer-readable storage medium storing a program for image processing, the program comprising the steps of: decoding image data which is converted into hierarchical coded data; and decrypting a hierarchy to which is added a code for causing a part of a process of the decoding means to be skipped among the hierarchical coded data.

In a twelfth aspect, the present invention provides a computer-readable storage medium storing a program for image processing, the program comprising the steps of: decoding an image file composed of hierarchical coded data; and controlling the decoding step to decode a hierarchy to which is not added a code for causing a part of a process of the decoding step to be skipped among the hierarchical coded data.

In a thirteenth aspect, the present invention provides a computer-readable storage medium storing a program for image processing, the program comprising the steps of: converting image data into hierarchical coded data; and adding to a predetermined hierarchy among the hierarchical coded data a code for causing a part of a process for decoding the hierarchical coded data to be skipped.

Still other objects of the present invention, and the advantages thereof, will become fully apparent from the following detailed description of the embodiment.

DETAILED DESCRIPTION OF THE PREFERRED EMBODIMENT

The preferred embodiment of the present invention will now be described below in detail with reference to the drawings.

Figure 1:
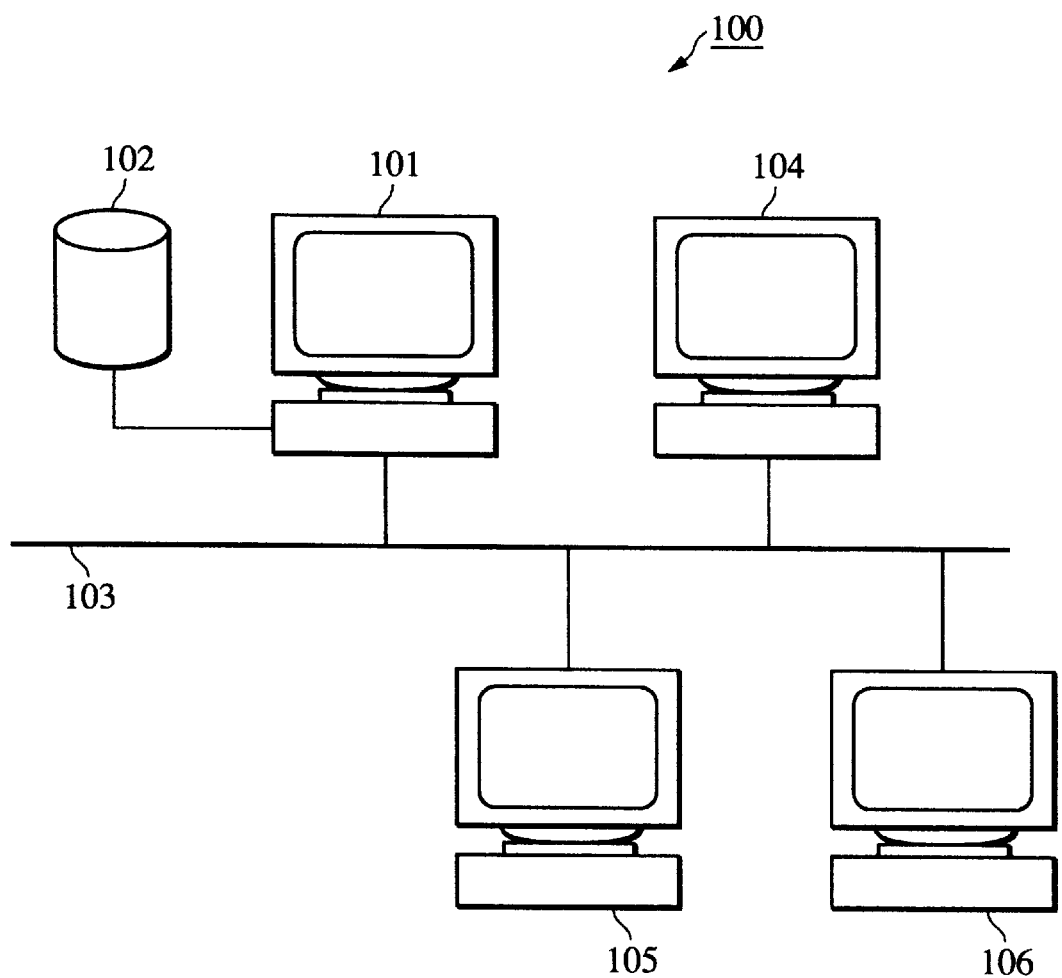
FIG. 1 is a block diagram showing an example of the construction of an image data distribution system according to an embodiment of the present invention.

FIG. 1 is a block diagram showing an example of the construction of an image data distribution system 100 according to this embodiment.

This image data distribution system 100 is constructed in such a way that, as shown in FIG. 1, a server machine (server side) 101 which stores, in large amounts, image data on which a hierarchical coding process is performed, in a magnetic disk apparatus 102 which is an external storage apparatus. The server side 101 is connected to client machines (client side) 104 to 106 over a network 103. Therefore, the server side 101 and each of the client sides 104 to 106 exchange various data with each other over the network 103.

Figure 2:
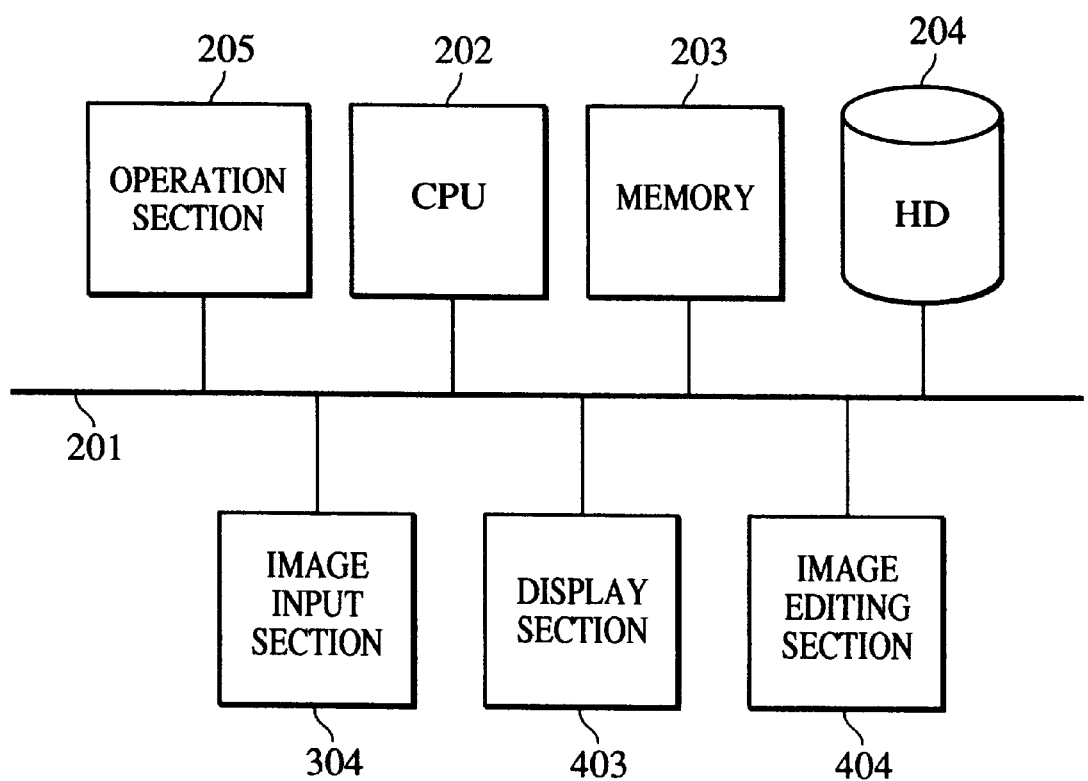
FIG. 2 is a block diagram showing an example of the basic construction of an electronic apparatus which is a constituent of the image data distribution system according to the embodiment of the present invention.

The server side 101 and the client side 104 to 106 are constructed in the same way, for example, as shown in FIG. 2, an operation section 205, a CPU 202, a memory 203, a HD 204, and the like are connected via a bus 201.

With such a construction, the operation section 205 is used by a user to issue instructions of various operations to the machines 101 and 104, and is formed of a keyboard, a mouse, and the like. The CPU 202 supervises the overall operation control of the machines 101 and 104 and performs various computation processes in accordance with an instruction given from the operation section 205. The memory 203 functions as a work memory for executing various processing programs and a temporary work memory. The HD 204 is a disk apparatus for storing various processing programs, image data, and the like. Therefore, for example, the CPU 202 reads various processing programs stored in the HD 204 into the memory 203 and executes them, thereby performing overall operation control of the machines and various computation processes.

FIG. 2 shows the basic construction of each machine of the server side 101 and each of the client side 104 to 106. In addition to the operation section 205, the CPU 202, the memory 203, and the HD 204, various other component sections (an image input section 304, a display section 403, an image editing section 404, etc.) are provided.

Figure 3:
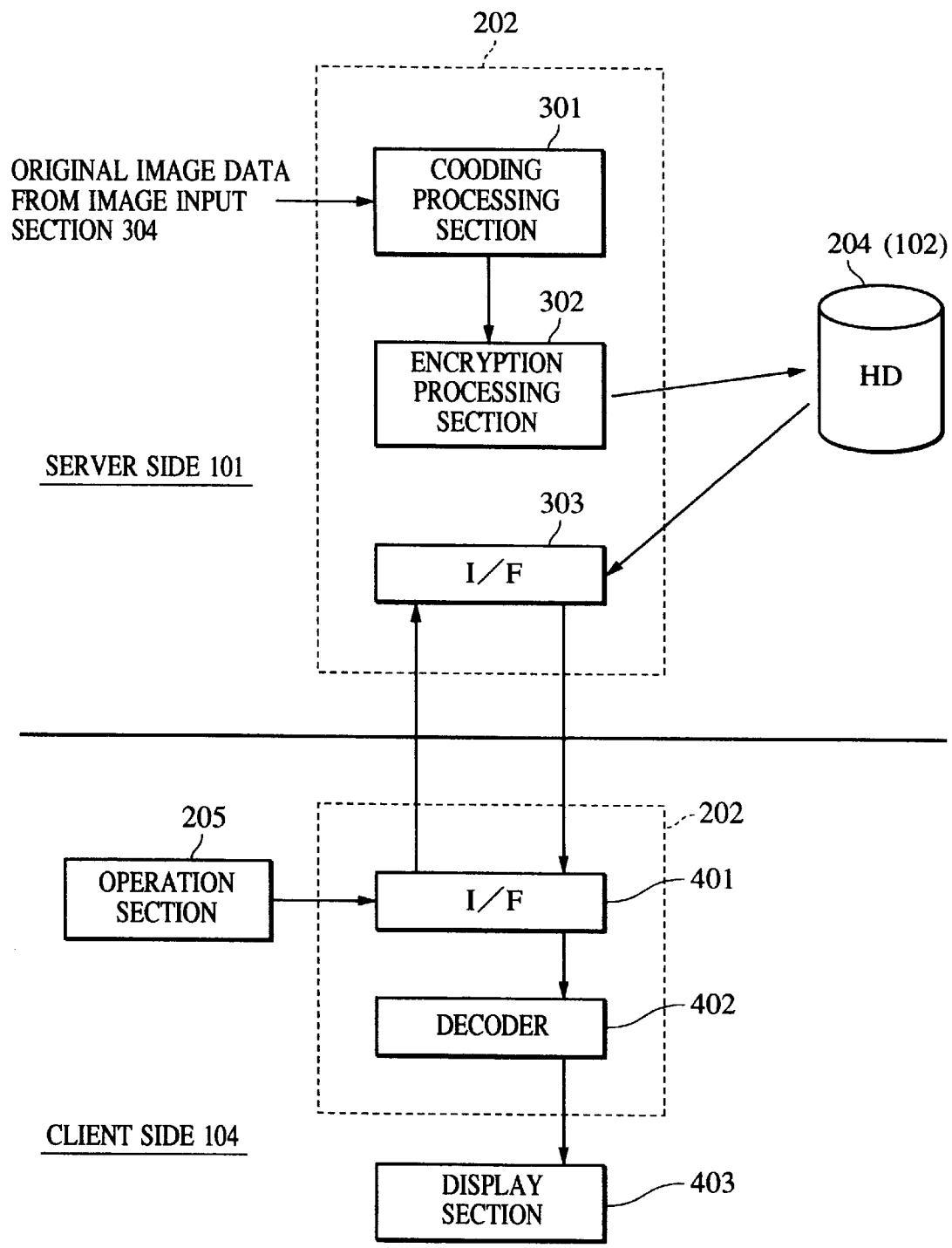
FIG. 3 is a block diagram illustrating the characteristic construction of the image data distribution system according to the embodiment of the present invention.

Next, referring to FIG. 3, a description is given of the most characteristic functional construction and processing operation of the image data distribution system 100.

As shown in FIG. 3, the server side 101 comprises a coding processing section 301, an encryption processing section 302, and a communication interface (I/F) 303, which are constituents of the CPU 202 shown in FIG. 2.

In such a server side 101, the coding processing section 301 codes original image data input via the image input section 304 in accordance with a predetermined coding method in order to create image data having a hierarchical structure (hierarchical coded data). Here, the image input section 304 is a camera unit for creating original image data from an optical image of a subject to be photographed or a reproduction unit for reading original image data stored in a magnetic disk, a semiconductor memory, or the like.

The encryption processing section 302 performs a predetermined encryption process on coded data of the highest resolution portion or coded data of a plurality of hierarchies containing the above data, and stores it as an image file in the HD 204 (corresponding to the magnetic disk apparatus 102 of FIG. 1) shown in FIG. 2. The I/F 303 reads an image file requested from the client side 104 among a plurality of image files stored in the HD 204 and transmits it to the client side 104.

In contrast, the client side 104 comprises a communication interface (I/F) 401 and a decoder 402, which are constituents of the CPU 202 shown in FIG. 2. Also, in addition to the construction shown in FIG. 2, the client side 104 comprises a display section 403.

The I/F 401 transmits a request in accordance with an instruction from the operation section 205 shown in FIG. 2 to the server side 101 and receives various data (including an image file) from the server side 101. The decoder 402 decodes (reconstructs into the original image data) an image file supplied from the server side 101 via the I/F 401. The display section 403 displays the image data obtained by the decoder 402.

For the image coding method used in the image data distribution system 100 in this embodiment, for example, a progressive JPEG method or a JBIG method may be used. A description is given below specifically for an operation of the image data distribution system 100 in each case. (When the progressive JPEG method is used)

First, an image coding process in accordance with the progressive JPEG method is described in detail.

Figure 4:
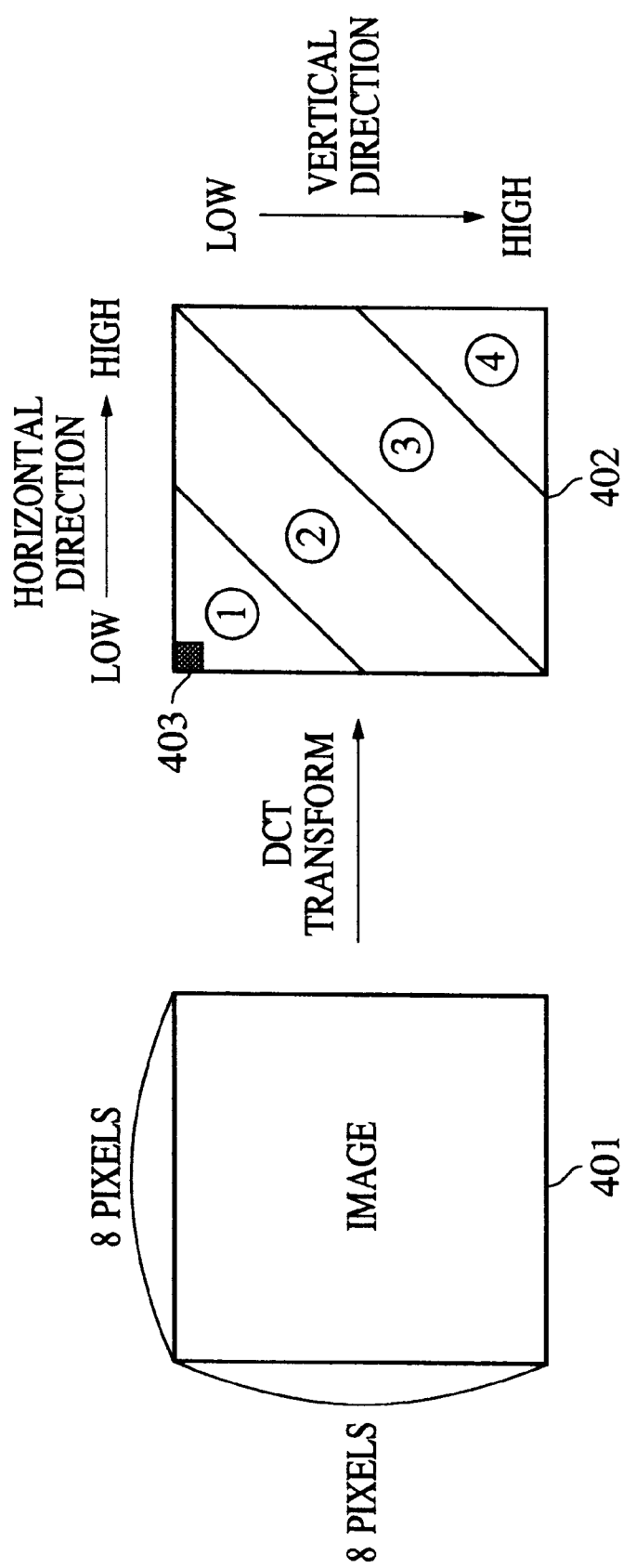
FIG. 4 is an illustration of an image coding process in which a progressive JPEG method is used according to the embodiment of the present invention.

In this method, for example, as shown in FIG. 4, the coding processing section 301 divides an original image into a plurality of 8×8 pixel blocks, and performs a discrete cosine transform (DCT) process on each block unit. Then, the DCT coefficient obtained thereby is quantized and divided into a plurality of scanning regions.

As a scanning and dividing method at this time, for example, a spectral-selection (s-s) method is used. This s-s method is a method in which the DCT coefficient of each block is divided into a plurality of groups (that is, a plurality of frequency bands formed of predetermined frequency components), in a first scan, only the first band is coded in units of all the blocks (or N (N≧1) blocks) which form the original image, and for subsequent scans, similarly to the first scan, one band each is coded. This method makes it possible to hierarchically code the DCT coefficient in the frequency direction.

For example, as shown in FIG. 4, a particular block 401 is taken note of. The coding processing section 301 divides the AC component of the DCT coefficient into four bands of ① to ④. Therefore, the DCT coefficient of the block 401 is divided into five bands of the AC components 402 of ① to ④ and the DC component 403. Then, the coding processing section 301 divides each block into bands and each band is scanned into codes in the unit of the entire image (or an image formed of N blocks). This makes it possible to obtain five hierarchical coded data such that the AC components 402 of ① to ④ and the DC component 403 are independently coded with respect to each other.

Figure 5:
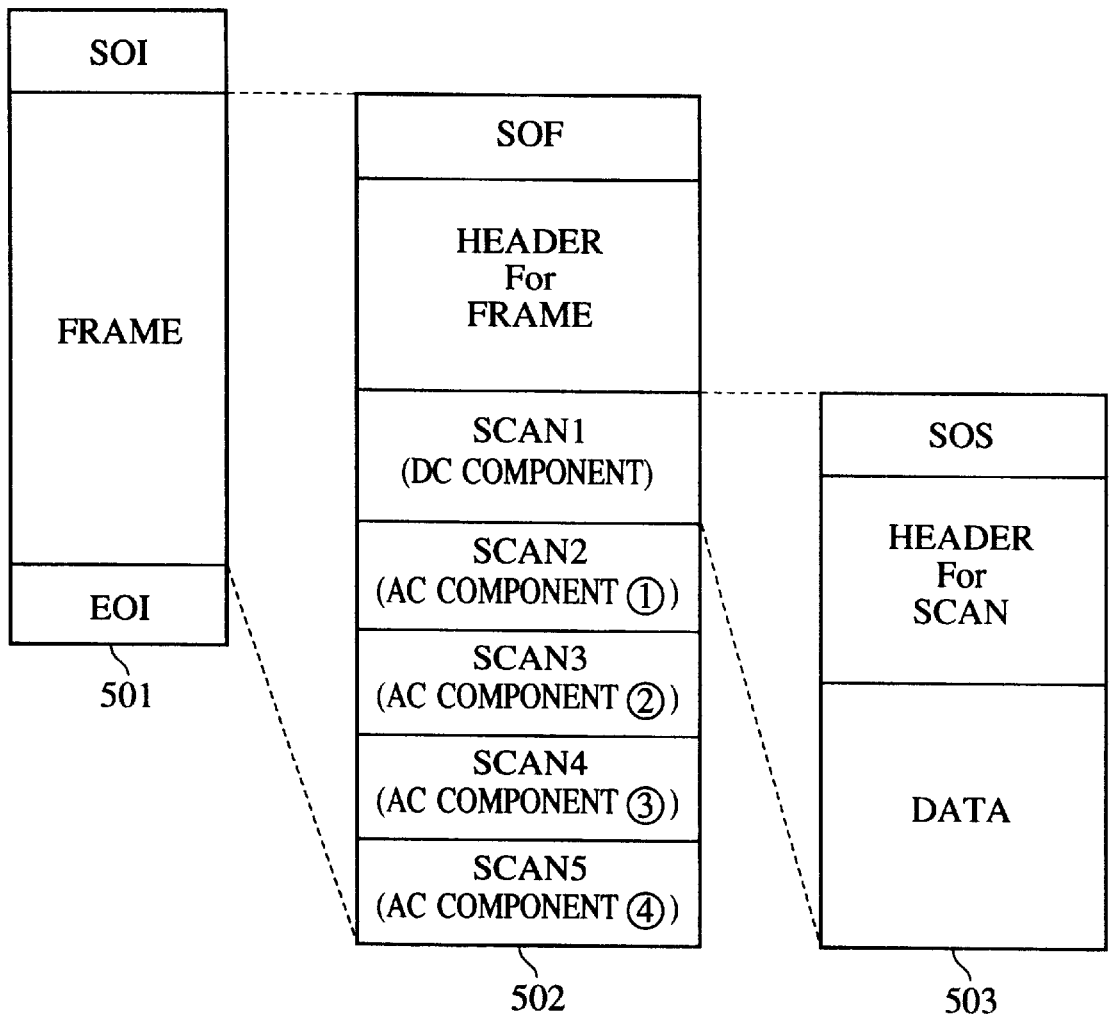
FIG. 5 is an illustration of the data format of an image coded by the image coding process of FIG. 4.

Next, referring to FIG. 5, a description is given of the data format of an image coded in accordance with the progressive JPEG method.

As shown in FIG. 5, the coding processing section 301 codes an original image by the above-described technique and creates one frame (Frame) 502 sandwiched between SOI (Start of Image) and EOI (End of Image).

The frame 502 starts with SOF (Start of Frame) and is followed by a header (Header for Frame) for the frame 502, and SCAN1 containing the coded data of the DC component, SCAN2 containing the coded data of the AC component ①, SCAN3 containing the coded data of the AC component ②, SCAN4 containing the coded data of the AC component ③, and SCAN5 containing the coded data of the AC component ④.

The five scans are formed in the same way. For example, SCAN1 (503 of FIG. 5) starts with SOS (Start of Scan) and is followed by a header (Header for Scan) for the scan and data (Data) such that only the DC component of the image is compressed and coded.

Here, when the data of the format shown in FIG. 5 is decoded (reconstructed into the original image data), this is performed in the sequence of the DC component and the AC components ①, ②, ③, and ④. Therefore, when the decoder 402 performs decoding up to AC component ④, the display section 403 can obtain the original image, that is, the image of the highest resolution. In contrast, in the case of partial decoding, that is, for example, when up to the AC component ② of FIG. 4 is decoded, in comparison with the image in which up to the AC component ④ is decoded, the image size is the same, but a "blurred" image, that is, an image of the lowest resolution, is obtained. coefficient, in addition to the above-mentioned s-s method, another method, for example, a successive approximation method, a method in which the successive approximation method and the spectral-selection method are combined, or other methods, may be used.

Figure 6:
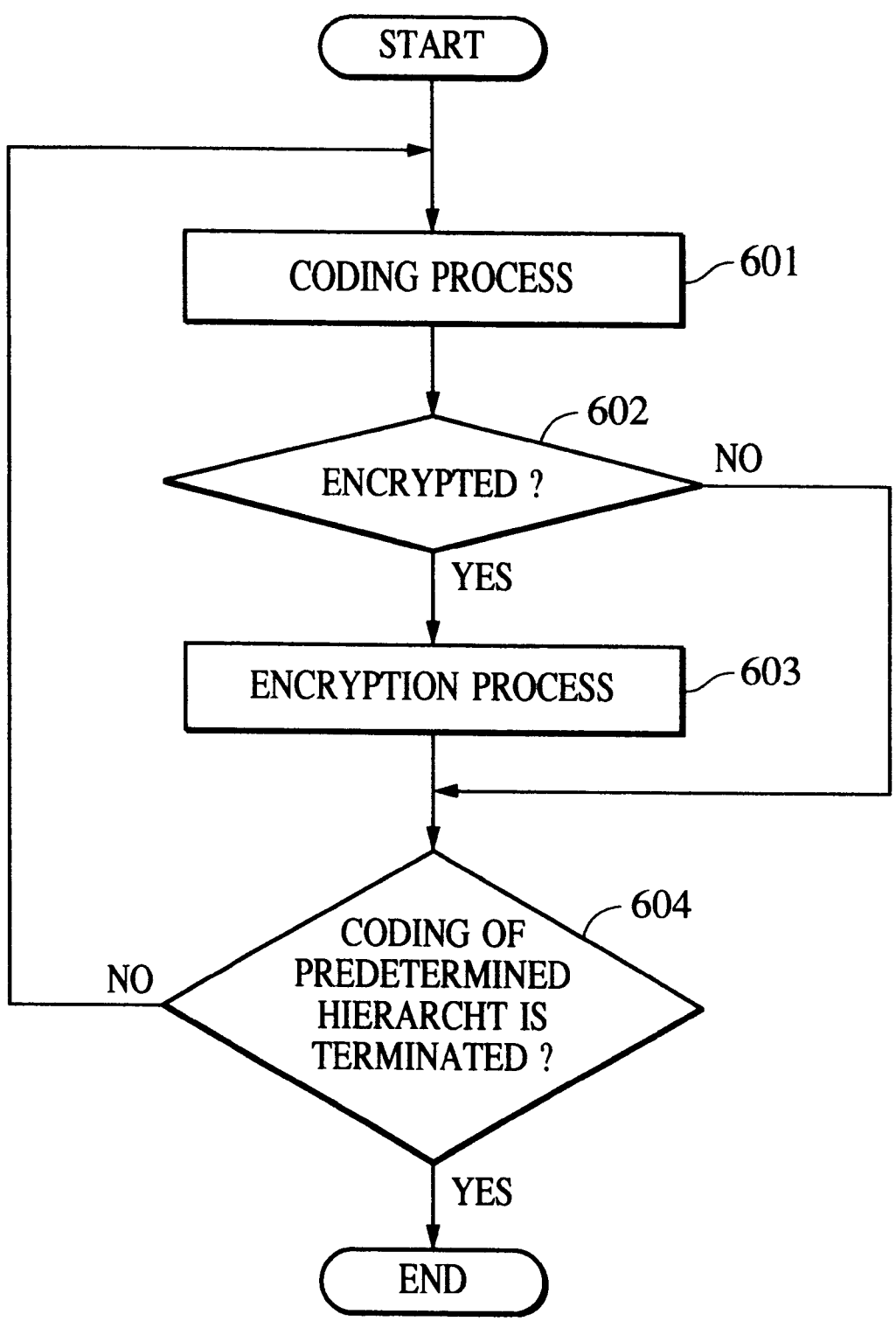
FIG. 6 is a flowchart illustrating an image file creation procedure according to the embodiment of the present invention.

Next, referring to FIG. 6, a description is given of an example of an image file creation procedure on the server side 101 of this embodiment. Here, a processing program in accordance with a flowchart, such as that shown in FIG. 6, is stored in the HD 204 of the server side 101. The CPU 202 of the server side 101 reads this processing program from the HD 204 and controls the creation of an image file. Specifically, the server side 101 operates as described below.

Initially, the coding processing section 301 performs a coding process conforming to the above-described progressive JPEG method on the original image data which is divided into 8×8 pixel blocks, thereby sequentially creating coded data of each hierarchy (in this example, SCAN1 to SCAN5 shown in FIG. 5) (step S601).

Next, the CPU 202 determines whether or not, for each hierarchy, coded data of each hierarchy created by the coding processing section 301 is coded data of a hierarchy to be encrypted (step S602).

When it is determined that the coded data is coded data of a hierarchy which is not to be encrypted, the process proceeds to step S604 (to be described later) without taking any action.

When it is determined in step S602 that the coded data is coded data of a hierarchy to be encrypted, the encryption processing section 302 performs a predetermined encryption process on the coded data of the hierarchy and the additional information thereof (step S603).

Figure 7:
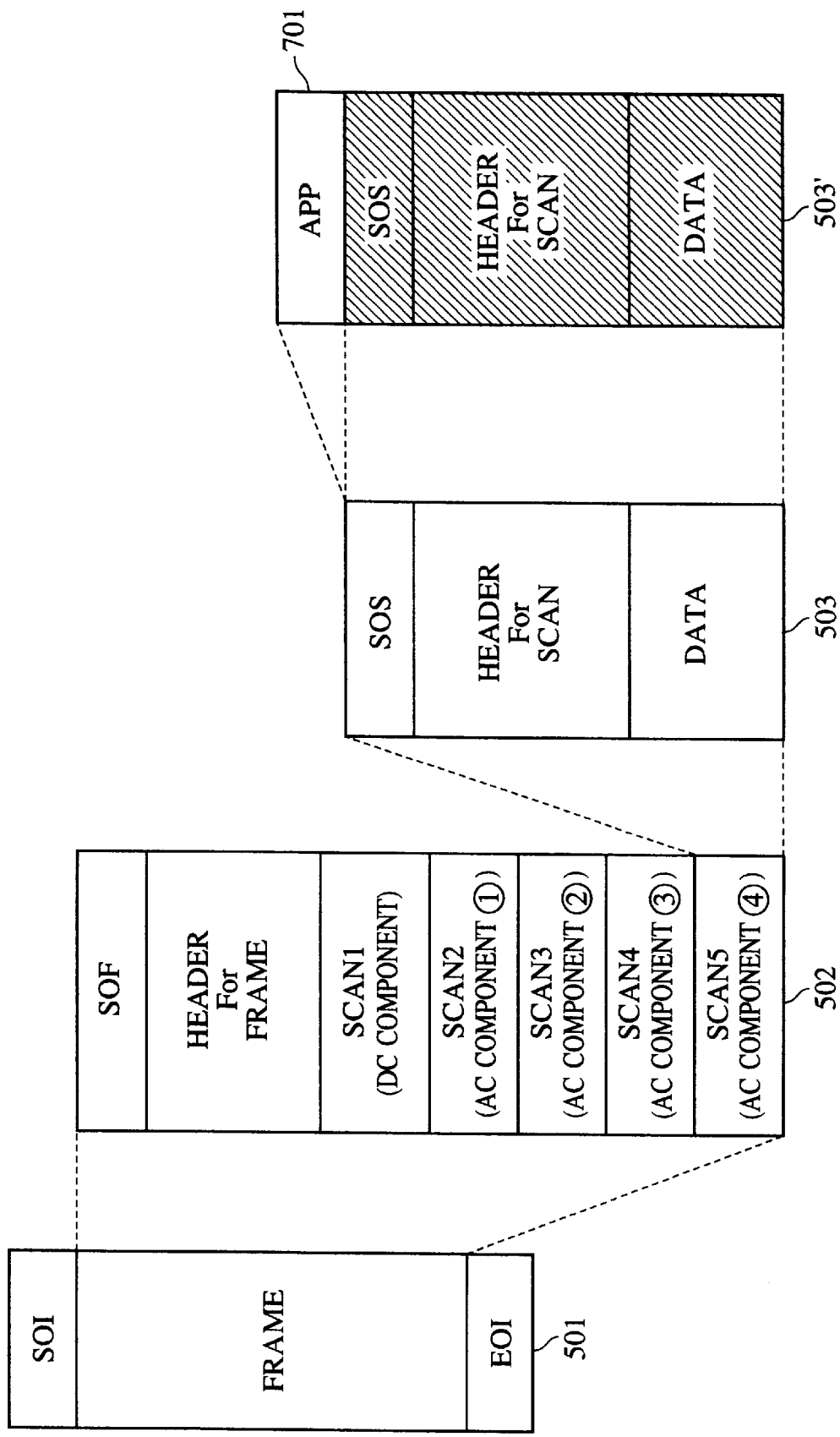
FIG. 7 is a detailed illustration of an encryption process according to the embodiment of the present invention.

Here, as shown in FIG. 7, the encryption processing section 302 performs a predetermined encryption process (indicated by the hatched portions in FIG. 7) on the coded data of the hierarchy to be encrypted (for example, SCAN5 of FIG. 5). Then, the encryption processing section 302 adds an APP (reserved for APPlication use) marker code 701 defined in the JPEG method to the encrypted data 503'. At this time, information regarding encryption (for example, key information) may be contained in an area following the APP marker code 701.

The above-mentioned APP marker code is a marker code defined to specify an area which can be freely used in various applications. Usually, various additional information dependent upon an application is stored in the area specified by this APP marker code. A decoding program conforming to the JPEG method handles the area specified by the APP marker code as information dependent upon the application and skips the decoding process of the data in that area. In this embodiment, an APP marker code is added to the coded data of the encrypted hierarchy (that is, SCAN5 of FIG. 5) and the coded data is assumed to be information which is not required for a normal decoding program.

After processing of this step S603, the process proceeds to step S604.

In step S604, the CPU 202 determines whether or not the coding process of the original image data is terminated in the coding processing section 301 and an encryption process of the coded data of the predetermined hierarchy is terminated in the encryption processing section 302 (step S604).

When it is determined in step S604 that the process is not yet terminated, the process returns to step S601 where the coded data of the next hierarchy is created, and the subsequent processing steps are performed in sequence in the above-described manner.

When it is determined in step S604 that the process is terminated, the image file creation process is terminated.

The image file (the image data in which only the coded data of a predetermined hierarchy among a plurality of hierarchies and the additional information thereof are encrypted) obtained in the above-mentioned steps S601 to S604 is stored in the HD 204.

With respect to the other images, processing similar to steps S601 to S604 is performed. As a result, a plurality of types of image files are stored in the HD 204.

In contrast, in the client side 104, when an instruction of a request for an image is made from the operation section 205, a request for the image in accordance with the instruction is transmitted to the server side 101 via the I/F 401.

In the server side 101, the I/F 303 receives a request for the image from the client side 104, reads an image file corresponding to the request for the image from the HD 204, and transmits it to the client side 104 which has made the request.

Figure 10:
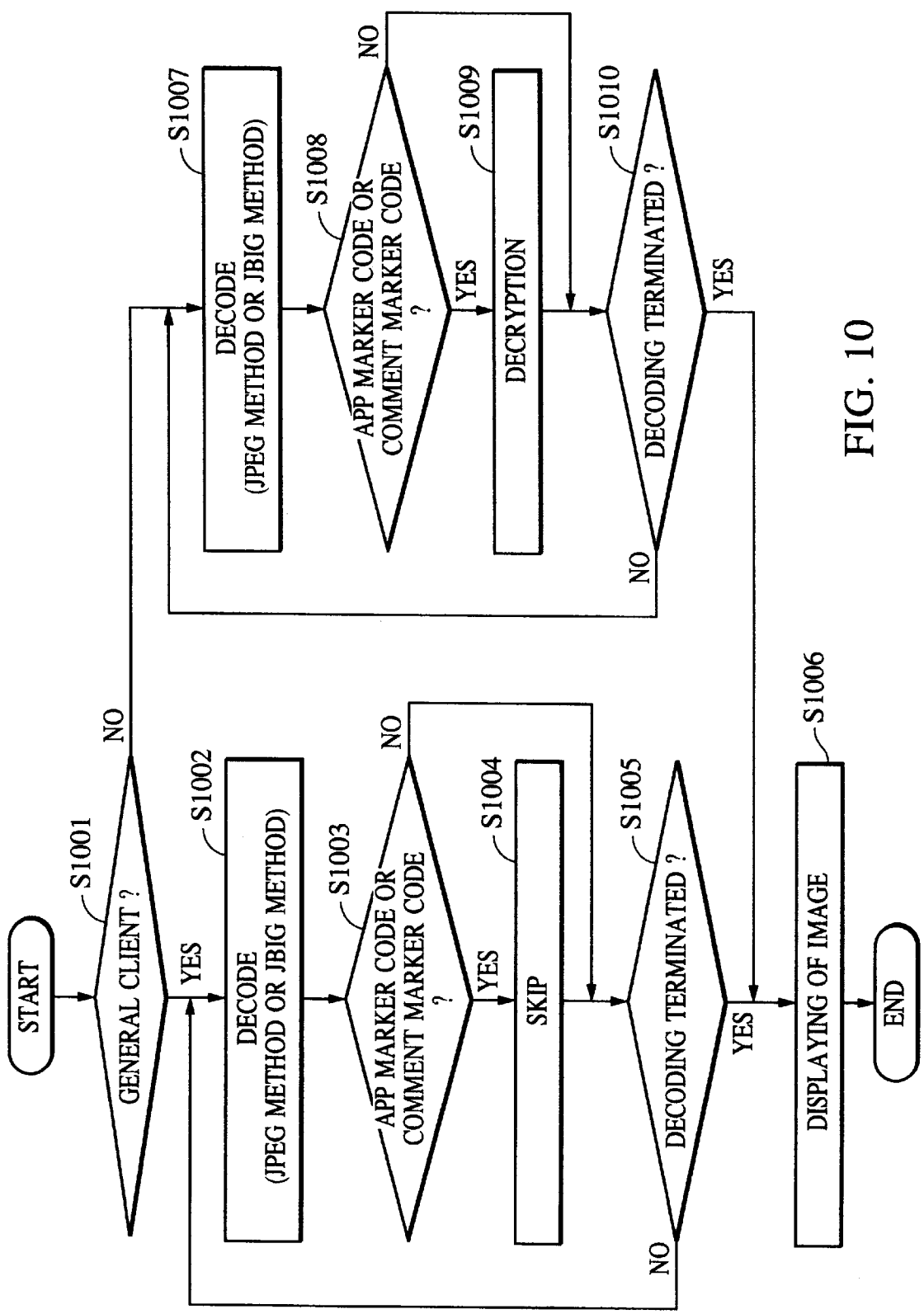
FIG. 10 is a flowchart illustrating a procedure up to the displaying of an image file.
Figure 11:
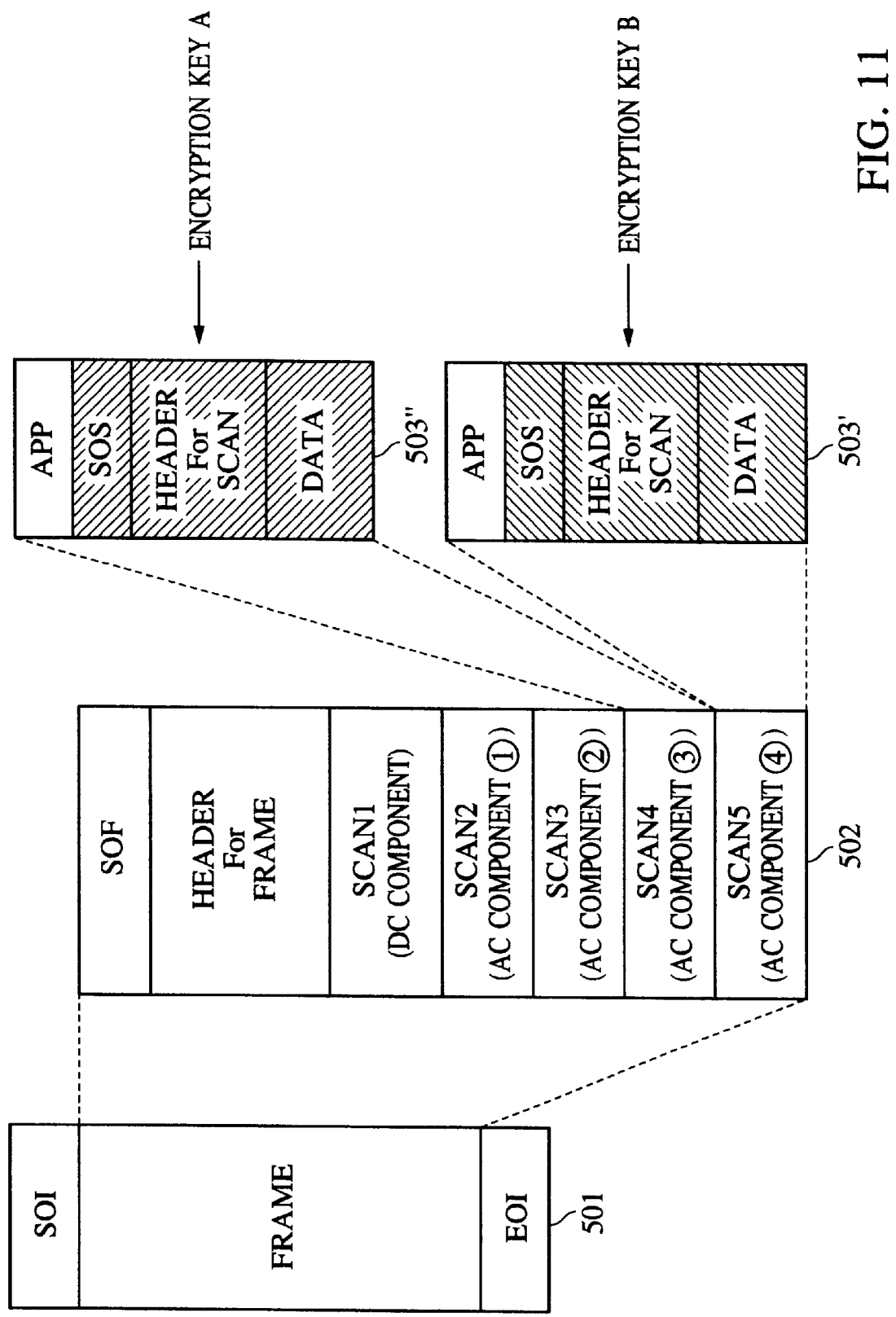
FIG. 11 is a detailed illustration of another example of an encryption process according to the embodiment of the present invention.

The client side 104 receiving this image file performs a process in accordance with a processing program stored in the HD 204, as shown in FIG. 10.

The decoder 402 decodes that portion (that is, the coded data to which the APP marker code 701 is not added), which is not encrypted, of the image file from the server side 101 in accordance with a decoding program conforming to the conventional JPEG method (steps S1001 to S1005 in FIG. 10).

Here, the image file transmitted to the client side 104 is coded data of a data format, such as that shown in FIG. 5, to which is added an APP marker code (see FIG. 7) such that only the AC component ④ (SCAN5) shown in FIG. 5 is encrypted.

The decoding procedure is specifically described below with reference to FIG. 10. Initially, when the client side 104 is not a specific client, but is instead a general client (step S1001), the decoder 402 decodes the SCAN1 to SCAN4 which are not encrypted portions in accordance with a decoding program conforming to the conventional JPEG method (that is, decoding by the conventional decoding program). At this time, since an APP marker code is added to the SCAN5 which is an encrypted portion, it is possible for the decoder 402 to skip the encrypted portion and to proceed with decoding without taking into account the encrypted portion (steps S1003 and S1004).

Then, the image data of a low resolution obtained by decoding by the decoder 402 is displayed on the screen of the display section 403 (step S1006). Alternatively, it is possible to perform an image editing process in an image editing section 404.

As a result, in the image data distribution system of this embodiment, it is possible to cause a general client to easily browse the contents of an image while protecting the copyright of the image in a network. Also, it is possible for the general client to easily decode an image file managed by the server without providing a special program separately by using only a conventional decoding program.

When, in contrast, the client side 104 is a specific client (a client having the right to obtain an image in a complete form for which a request is made to the server side 101, or an image of a higher resolution) (step S1001), the CPU 202 of the client side 104 requests key information required to decrypt the encrypted portion, to which the APP marker code is added, from the server side 101 via the I/F 401.

In the server side 101 receiving this request, the CPU 202 transmits the key information to the client side 104 via the I/F 303 only when it is determined that the client side 104 which has issued the request for the key information is a specific client.

In the client side 104 receiving this information, the I/F 401 receives the key information from the server side 101. For the SCAN1 to SCAN4 which are not the encrypted portions, the decoder 402 performs decoding (that is, decoding (steps S1007 to S1010) in accordance with the conventional decoding program) conforming to the conventional JPEG method, and for the SCAN5 which is an encrypted portion, the decoder 402 performs decryption in accordance with a dedicated decryption program by using the key information received by the I/F 401, and then performs decoding in accordance with the above-mentioned decoding program (steps S1008 and S1009). Therefore, the decoder 402 is able to obtain the original image in a complete form, that is, image data of the highest resolution. This image data of the highest resolution is displayed on the screen of the display section 403 (step S1006). Alternatively, an image editing process in the image editing section 404 can be performed.

As a result, in the image data distribution system of this embodiment, an image of a high resolution can be easily provided to a specific client while protecting the copyright of the image in a network. Also, the server side 101 is able to easily manage an image of a low resolution which is supplied to a general client and an image of a high resolution which is supplied to a specific client by one image file without managing them in separate image files. (When the JBIG method is used)

When the JBIG method is used, the operation is basically the same as that when the above-mentioned progressive JPEG method is used. The JBIG method differs from the progressive JPEG method in that image data of a plurality of resolutions is coded. Here, only the differences from the case when the progressive JPEG method is used are specifically described.

In this method, coded data of a plurality of hierarchies is obtained by creating in sequence a low resolution image (reduced image) in which the resolution is reduced by one-half (the number of pixels along each direction is reduced by ½) along both the horizontal (X) and vertical (Y) directions and by coding it. Therefore, the size of the reproduced image differs depending upon each hierarchy.

For this reason, the coding processing section 301 of this embodiment creates in sequence image data of a resolution ① obtained by decreasing the resolution of the original image data, image data of a resolution ② obtained by similarly decreasing the resolution of the image data of the resolution ①, and image data of a resolution ③ obtained by similarly decreasing the resolution of the image data of the resolution ②, and codes each of the image data of these three resolutions. The data format of the hierarchical coded data obtained thereby is, for example, as shown in FIG. 8.

Figure 8:
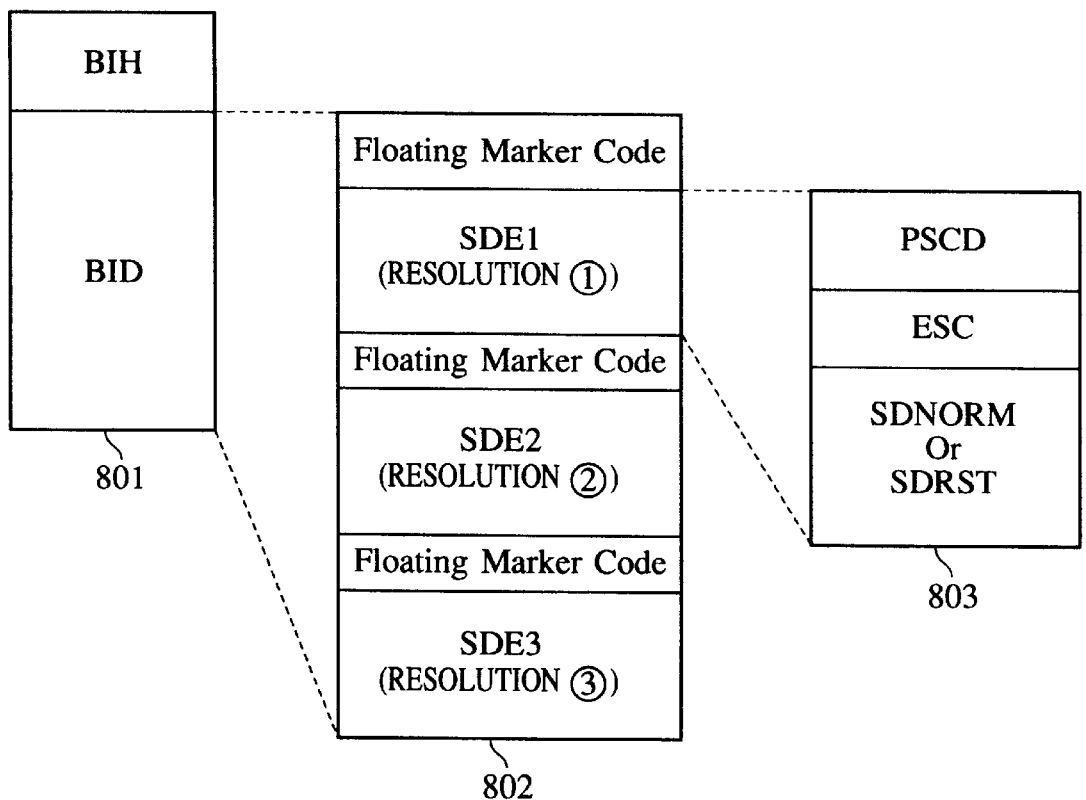
FIG. 8 is an illustration of an image coding process in which a JBIG method is used according to the embodiment of the present invention.

Referring to FIG. 8, the coding processing section 301 codes the original image in order to creates a BIH (header part) and a BID (data part) 802.

The BID 802 is composed of SDE1 (containing the coded data of the first hierarchy obtained by coding the image data of the resolution ①) following a floating marker code, SDE2 (containing the coded data of the second hierarchy obtained by coding the image data of the resolution ②) similarly following a floating marker code, and SDE3 (containing the coded data of the third hierarchy obtained by coding the image data of the resolution ③) similarly following a floating marker code.

The three SDE1 to SDE3 are formed in the same way. For example, the SDE1 of the resolution ① starts with PSCD, and is followed by ESC and SDNORM (or SDRST, data such that the image of the resolution ① is compressed and coded).

In the SDE1 to SDE3 composed of the coded data of each resolution (each hierarchy), it is determined whether the SDE1 composed of the coded data of the first hierarchy is the coded data of the lowest resolution or the highest resolution depending upon resolution "HITOLOW" or "LOWTOHI". Here, taking "LOWTOHI", it is assumed that the SDE1 composed of the coded data of the first hierarchy is the coded data of the lowest resolution and the SDE3 composed of the coded data of the last hierarchy is the coded data of the highest resolution.

Such hierarchical coded data is created in accordance with a processing program stored in the HD 204 of the server side 101. This processing program is executed in accordance with the same procedure as that of FIG. 6.

The encryption processing section 302 performs an encryption process on only the coded data of a predetermined hierarchy (resolution) among the hierarchical coded data created by the coding processing section 301 and the additional information thereof.

Figure 9:
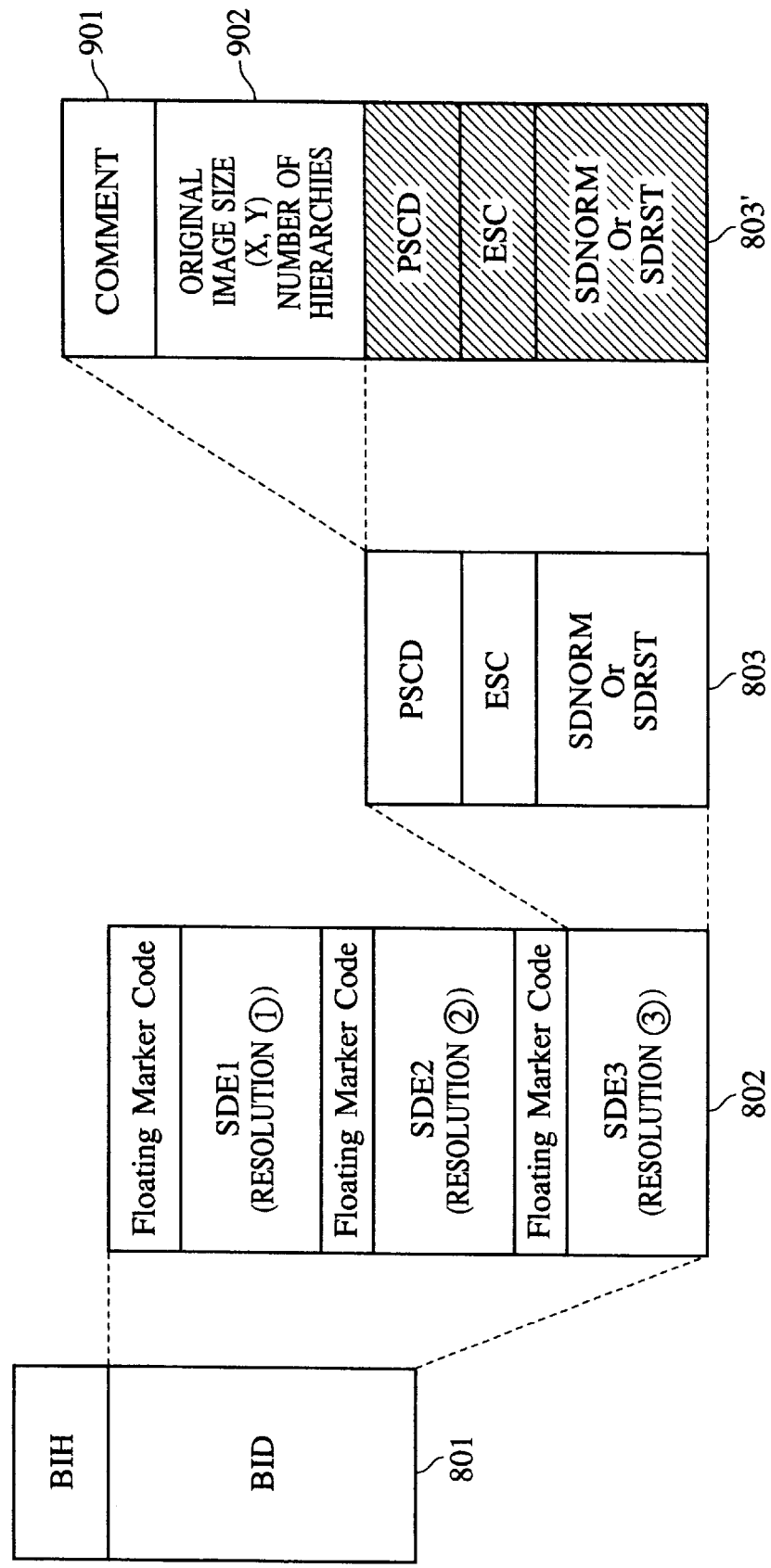
FIG. 9 is a detailed illustration of an encryption process according to the embodiment of the present inventions

For example, as shown in FIG. 9, the encryption processing section 302 performs an encryption process (indicated by the hatched portions in FIG. 9) on only the coded data (for example, the SDE3 of FIG. 8) of the highest resolution (=the resolution ③), and then adds a comment marker code 901 defined in the conventional JBIG method to this encrypted data 803'. Here, the coding processing section 301 changes the image size information (that is, the X-direction size and the Y-direction size of the highest resolution) stored within the BIH (see FIG. 8) and the information for the number of hierarchies, and adds the original image size information and the information for the number of hierarchies in such a manner as to follow the above comment marker code 901 (902 of FIG. 9). Here, the comment marker code is a marker code defined to specify an area which can be freely used by various applications or by a user. The addition of this marker code makes it possible for the decoding program conforming to the JBIG method to skip the decoding process of the encrypted coded data.

Therefore, the image file obtained by such an encryption process is stored in the HD 204, is read in accordance with a request for the image from the client side 104, and is transmitted to the client side 104.

In the client side 104 receiving this image, when the client side 104 is not a specific client, but is instead a general client (step S1001), the decoder 402 decodes the SDE1 and SDE2 which are not encrypted portions in accordance with a decoding program conforming to the conventional JBIG method (steps S1002 to S1005). At this time, since a comment marker code is added to the SDE3 which is an encrypted portion, it is possible for the decoder 402 to skip the encrypted portion and to proceed with decoding without taking into account the encrypted portion (steps S1003 and S1004). Therefore, in this case, the image data of the resolution ② is displayed on the screen of the display section 403.

When, in contrast, the client side 104 is a specific client (step S1001), the decoder 402 decodes the SDE1 and SDE2 which are not the encrypted portions (steps S1007 to S1010) in accordance with a decoding program conforming to the conventional JBIG method, and decodes the SDE3 which is an encrypted portion after decrypting it using the key information from the server side 101 (steps S1008 and S1009). Specifically, for the SDE3 which is an encrypted portion, the image size information and the hierarchy class information (additional information 902 following the comment marker code 901) added to the SDE3 are set in the applicable fields within the BIH, and the encrypted portions (the hatched portions in FIG. 9) are decrypted in accordance with a dedicated decryption program by using the key information and decoded in accordance with the decoding program. Therefore, in this case, the image data of the highest resolution (=resolution ③) is displayed on the screen of the display section 403 (step S1006).

Although in the case where the JBIG method is used, a description is given by assuming the resolution to be "LOWTOHI", even if "HITOLOW" is assumed, processing is performed in a similar manner though the hierarchy in which the encryption process is performed is different. Also, in the case where the JBIG method is used, each hierarchy may be divided into a plurality of stripes so that an encryption process is performed in stripe units.

In a manner as described above, in this embodiment, on the server side, an encryption process is performed on only the coded data of a predetermined hierarchy (the last hierarchy, etc.) of the hierarchically coded original image, and an APP marker code or a comment marker code is added to the encrypted portions. This makes it possible for a conventional decoding program possessed by a general client to handle this encrypted portion as additional information dedicated to a comment or an application and to normally decode only the other portions (portions where no encryption process is performed).

Therefore, it is possible for the general client to normally decode an image file from the server without separately requiring a special decoding program and to obtain an image of low resolution. Since the encryption process of this image file can be decoded only by a specific client, it is possible to reliably prevent infringement of copyright. Furthermore, since the above-mentioned code is added to predetermined hierarchical coded data, the server is able to easily and efficiently manage an image of a low resolution which can be available to the general public and which can be referred to by anybody, an image of a relatively high resolution which can be available for a fee, an image of a high resolution which is transmitted to a specific client, and so on, by one image file, without the need to provide a plurality of image files.

The invention may be embodied in other specific forms without departing from the spirit or essential characteristics thereof.

For example, in the above embodiment, the server side manages (in this example, stores in the HD 204) an image file created by performing a coding process and an encryption process conforming to the progressive JPEG method or the JBIG method. In addition to this example, it is also possible for the server side 101 to manage hierarchical coded data obtained by performing the above-mentioned coding process, and to encrypt only the coded data of a predetermined hierarchy and transmit it to the client side 104 when a request for the image occurs from the client side 104.

In a case in which the progressive JPEG method is used, an encryption process is performed on coded data of a predetermined hierarchy among the hierarchical coded data, and an APP marker code is added to the encrypted portion. In a case in which the JBIG method is used, an encryption process is performed on coded data of a predetermined hierarchy among the hierarchical coded data, and a comment marker code is added to the encrypted portion. In addition to this example, an APP marker code or a comment marker code may be added to coded data of a predetermined hierarchy among the hierarchical coded data without performing an encryption process. The reason for this is that the portion to which an APP marker code or a comment marker code is added cannot be decoded by a conventional decoding program. With such a construction, a simpler encryption process becomes possible, and substitution for an actual encryption process also becomes possible. The encryption process may be performed on coded data of a plurality of hierarchies in addition to coded data of a particular hierarchy.

Furthermore, as shown in FIG. 10, an encryption process may be performed in a hierarchical manner by using a plurality of different encryption keys A and B. For example, a plurality of clients 104 to 106 connected to the server side 101 are classified into three types: a general user, a first user, and a second user. Encryption may be performed in such a way that, for the general user, decoding of the first hierarchy (the SCAN1 to SCAN3 of FIG. 10) is allowed; for the first user, decoding of the second hierarchy (the SCAN1 to SCAN4 of FIG. 10) is allowed; and for the second user, decoding of the third hierarchy (the last hierarchy) is allowed. This makes it possible to easily realize changing of the contents of an image file to be provided to each user from the general user to the second user according to the classification of the user.

As a storage medium for storing a program code of software for realizing the functions of the above-described embodiment, a hard disk 204 is used. In addition, a ROM, a floppy disk, an optical disk, an optomagnetic disk, a CD-ROM, a CD-R, a magnetic tape, a non-volatile memory card, and so on may be used.

It is a matter of course that not only the case in which the functions of the embodiment are realized by the CPU 202 by executing a program code read from the HD 204, but also the following case is within the scope of the present invention, in which a part or the entirety of actual processing is performed by the CPU 202 operating on the OS in accordance with the instructions of the program code, thereby realizing the functions of the embodiment.

In addition, it is a matter of course that the following case is within the scope of the present invention, in which a program code read from the HD 204 is loaded into a memory provided in a function expansion board inserted into the CPU 202 or a function expansion unit connected to the computer, after which a part or the entirety of actual processing is performed by a CPU provided in the function expansion board or the function expansion unit, thereby realizing the functions of the embodiment.

Therefore, the above-described embodiment is merely an example in all respects, and must not be construed to limit the invention.

The scope of the present invention is defined by the scope of the appended claims, and is not limited at all by the specific descriptions of this specification. Furthermore, all modifications and changes belonging to equivalents of the claims are considered to fall within the scope of the present invention.

What is claimed is:

1. An image processing apparatus comprising:
    coding means for converting image data into hierarchical coded data; and
    encryption means for encrypting a predetermined hierarchy among the hierarchical coded data,
        wherein a code for causing a part of a process for decoding the hierarchical coded data to be skipped is added to the encrypted hierarchy.

2. An image processing apparatus according to claim 1, wherein said encryption means encrypts at least one hierarchy including a hierarchy corresponding to a highest-resolution component.

3. An image processing apparatus according to claim 1, wherein said encryption means encrypts coded data of at least one hierarchy including a hierarchy corresponding to a highest-frequency component.

4. An image processing apparatus according to claim 1, wherein said encryption means hierarchically encrypts the hierarchical coded data.

5. An image processing apparatus according to claim 1, wherein said encryption means hierarchically encrypts the hierarchical coded data according to a classification of a user.

6. An image processing apparatus according to claim 1, wherein said encryption means encrypts each of a plurality of hierarchies by a different encryption key.

7. An image processing apparatus according to claim 1, wherein said coding means converts the image data into the hierarchical coded data in accordance with a JPEG method.

8. An image processing apparatus according to claim 1, wherein said coding means converts the image data into the hierarchical coded data in accordance with a JBIG method.

9. An image processing apparatus according to claim 1, wherein the image data is supplied from a camera unit which creates an image from an optical image of a subject to be photographed.

10. An image processing apparatus according to claim 1, wherein the image data is supplied from a camera unit which reproduces an image from a predetermined recording medium.

11. An image processing apparatus according to claim 1, wherein said image processing apparatus transmits the hierarchical coded data to an external apparatus.

12. An image processing apparatus comprising:
    decoding means for decoding an image file composed of hierarchical coded data; and
    decryption means for decrypting a hierarchy to which is added a code for causing a part of a process of said decoding means to be skipped among the hierarchical coded data.

13. An image processing apparatus comprising:
    decoding means for decoding an image file composed of hierarchical coded data; and
    control means for controlling the decoding means to decode a hierarchy to which is not added a code for causing a part of a process of said decoding means to be skipped among the hierarchical coded data.

14. An image processing apparatus comprising:
    coding means for converting an input image into hierarchical coded data; and
    means for adding a code, for causing a part of a process for decoding the hierarchical coded data to be skipped, to a predetermined hierarchy among the hierarchical coded data.

15. An image processing apparatus according to claim 1, further comprising:

encryption means for encrypting the predetermined hierarchy.

16. An image processing method comprising the steps of:

converting image data into hierarchical coded data;

encrypting a predetermined hierarchy among the hierarchical coded data; and adding to the encrypted hierarchy a code for causing a part of a process for decoding the hierarchical coded data to be skipped.

17. An image processing method comprising the steps of:

decoding image data which is converted into hierarchical coded data; and decrypting a hierarchy to which is added a code for causing a part of a process of the decoding step to be skipped.

18. An image processing method comprising the steps of:

decoding an image file composed of hierarchical coded data; and controlling the decoding step to decode a hierarchy to which is not added a code for causing a part of a process of said decoding step to be skipped among the hierarchical coded data.

19. An image processing method comprising the steps of:

converting image data into hierarchical coded data; and adding to a predetermined hierarchy among the hierarchical coded data a code for causing a part of a process for decoding the hierarchical coded data to be skipped.

20. An image processing system comprising:

a first apparatus comprising coding means for converting image data into hierarchical coded data, and means for adding, a predetermined code for causing a process for decoding hierarchical coded data to be skipped, to a predetermined hierarchy among the hierarchical coded data; and a second apparatus comprising decoding means for decoding the hierarchical coded data, wherein said second apparatus decodes a hierarchy other than the hierarchy to which the predetermined code is added.

21. A computer-readable storage medium storing a program for image processing, said program comprising the steps of:

converting image data into hierarchical coded data;

encrypting a predetermined hierarchy among the hierarchical coded data; and adding to the encrypted hierarchy a code for causing a part of a process for decoding the hierarchical coded data to be skipped.

22. A computer-readable storage medium storing a program for image processing, said program comprising the steps of:

decoding image data which is converted into hierarchical coded data; and decrypting a hierarchy to which is added a code for causing a part of a process of said decoding means to be skipped among the hierarchical coded data.

23. A computer-readable storage medium storing a program for image processing, said program comprising the steps of:

decoding an image file composed of hierarchical coded data; and controlling the decoding step to decode a hierarchy to which is not added a code for causing a part of a process of said decoding steps to be skipped among the hierarchical coded data.

24. A computer-readable storage medium storing a program for image processing, said program comprising the steps of:

converting image data into hierarchical coded data; and adding to a predetermined hierarchy among the hierarchical coded data a code for causing a part of a process for decoding the hierarchical coded data to be skipped.

* * * * *